July 13, 1943.  E. E. SIMMS  2,324,175
NON-LOSABLE NUT
Filed March 25, 1942
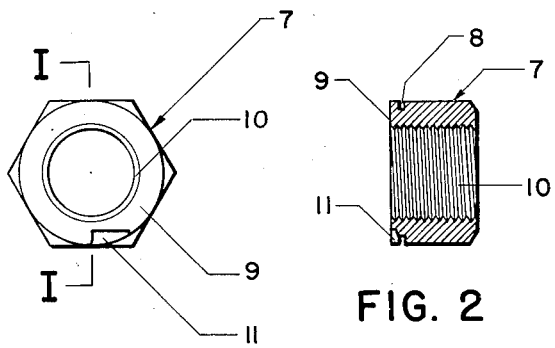
FIG. 1  FIG. 2
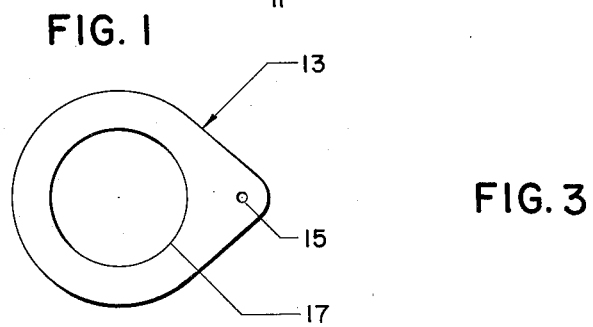
FIG. 3
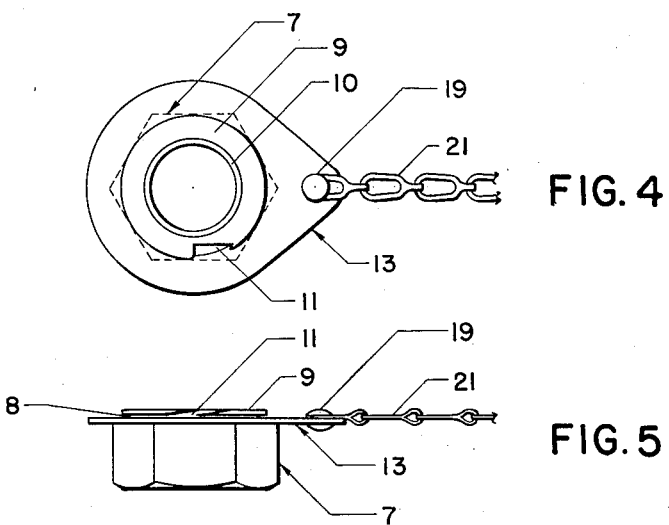
FIG. 4
FIG. 5
INVENTOR.
ELDON E. SIMMS
BY George Douglas Jones
ATTY Patented July 13, 1943

2,324,175

UNITED STATES PATENT OFFICE 2,324,175

NONLOSABLE NUT

Eldon E. Simms, Towson, Md., assignor to The Glenn L. Martin Company, Middle River, Md., a corporation of Maryland Application March 25, 1942, Serial No. 436,067

1 Claim. (Cl. 85—32)

This invention relates to securing devices or fastening means and particularly to chain and cable anchored collars or clips which can be secured to articles such as nuts, bolts, plugs, caps, and the like, to prevent their being removed from their point of attachment and lost.

Such articles could be directly chained to their point of attachment but to do so renders them unwieldy. Where a nut, bolt, plug, cap, or the like, is indirectly restrained by means of a slidably mounted collar or clip, it can be freely turned independently of the collar and without interference from the chain.

Securing devices of this nature are important to an industry that is constantly redesigning and producing new models and parts. Articles which must be constantly adjusted, inspected or serviced and which cannot be readily replaced must be insured against inadvertent misplacement or loss.

The method that has been used heretofore for securing such articles consisted of the slipping of a large collar of metal or the like material over the smaller head portion of a nut or bolt onto a still smaller neck portion, usually a groove, and then cold shrinking the collar to a size that would permit it to loosely engage the neck portion and yet not slide back over the head portion.

This method for shrinking a collar onto the neck portion of a nut or bolt was a difficult operation inasmuch as it required special tools and a high degree of skill on the part of the person performing it.

Under the above mentioned method, the collar was often ruptured to some unnoticeable extent during the shrinking operation. Such ruptures usually led to the later failure or breaking of the collar. Likewise, it was almost impossible to cold shrink a metal collar in a uniform manner by this method and obtain inner collar surfaces that were smooth.

The primary object of my invention is to provide an improved method for permanently locking a continuous collar made of rigid material around the grooved neck portion of a nut or bolt without rupturing the said collar or roughening the inner surfaces thereof which must remain smooth to afford loose and frictionless engagement of the said neck portion by the said collar.

Another object of my invention is to provide an improved method for quickly securing a rigid collar around the neck portion of a nut or bolt in a manner that will allow the said nut or bolt to rotate freely within said collar and at the same time will prevent the said nut or bolt from becoming detached from said collar.

A further object of my invention is to provide an improved method of securing a rigid restraining collar to a rotatable nut or bolt that has been prepared to receive it that permits easy attachment independently of the location of the said rotatable nut or bolt in respect to an adjacent structure.

Another object of my invention is to provide a rigid restraining collar for losable bolts and nuts and an improved method of securing them by means of said rigid restraining collar that will not permit their detachment without the destruction of either the said collar or the said nut or bolt.

Another object of my invention is to provide an improved method of readily attaching a collar made of metal or like non-resilient material around the neck portion of a bolt or nut having head and body portions of greater outer diameter than the diameter of the inner periphery of the said collar.

A still further object of my invention is to provide a novel method of threading a portion of a nut or bolt so that an anchored rigid collar of small inner diameter may be forced over a surface of a nut or bolt having a larger outer diameter.

Another object of my invention is to provide a rigid collar which when once directed over the head portion and onto the neck portion of a nut or bolt cannot be removed unless either it or the head portion of said nut or bolt are destroyed.

Further and other objects of my invention will be hereinafter set forth in the accompanying drawing which shows by way of illustration a preferred embodiment and the principle thereof, as well as the best mode of which I am now aware for applying that principle. Other embodiments of my invention employing the same or equivalent principles may be used and structural changes made as desired by those skilled in the art without departing from the present invention and within the spirit of the appended claim.

In the drawing:

Fig. 1 is a top plan view of a nut showing the method of threading the head portion thereof.

Fig. 2 is a cross-sectional view of a nut taken along the line I—I of Fig. 1, likewise showing the method of threading the head portion thereof.

Fig. 3 is a top plan view of a collar adapted to secure a rotatable nut by means of a chain or cable to an adjacent structure.

Fig. 4 is a top plan view of a rotatable nut having a chain or cable anchored collar around its neck portion.

Fig. 5 is a side plan view of a rotatable nut having a chain or cable anchored collar around its neck portion.

Nut 7 having the internally threaded surfaces 10 is provided with a grooved circular neck portion 8 and a circular head portion 9. The head portion 9 is provided with the thread 11 through which a collar 13 made of metal or like rigid material having a circular inner aperture 17 of less diameter than the diameter of the circular head portion 9 is threaded onto neck portion 8. The circular neck portion 8 is of less diameter than the circular inner aperture 17 of the collar 13 so that the nut 7 may be freely turned within the collar 13. Collar 13 is also provided with another aperture 15 along its outer surfaces so that the collar 13 may be fastened by means of rivet 19 to an anchored chain or cable 21.

The thread 11 (see Figs. 1, 2, 4, and 5) is steep enough to cause collar 13 to ride through it and into the grooved circular neck portion 8 from the outside at a relatively great angle. This angle between the collar 13 and the plane of the grooved circular neck portion 8 will diminish as more and more of the inner surface of the aperture 17 in collar 13 is fed through it onto neck portion 8. Once the inner periphery of the aperture 17 has ridden through thread 11, the collar 13 will assume the same plane as that of the neck portion 8. With collar 13 once riding in neck portion 8 it will be observed that if the collar 13 is held in a fixed position, the nut 7 may be easily turned or rotated within it. This is possible because the inner surface of the circular aperture 17 which is of slightly greater circumference than grooved neck portion 8 was originally smooth and has not been roughened by the threading operation.

The steepness of thread 11 is so great and its area so small in respect to the total restraining area of head portion 9 which has an external circumference slightly greater than aperture 17 of the collar 13 that it is impossible for the collar 13 to return from the plane of the neck portion 8 to the plane of the thread 11.

Nut 7 may be provided with any shaped external gripping surfaces. Likewise, it may be made of any rigid material like metal or the plastics. Nut 7 could be a bolt, plug, cap, or like article.

The material out of which collar 13 is formed has been termed a rigid material. By the term rigid material I mean a material such as metal which has very little elasticity when compared with a substance like rubber. Collar 13 is made out of a rigid material whose elasticity will not permit its small aperture 17 to be stretched over the larger head portion 9. However, collar 13 is preferably made out of rigid flexible material such as aluminum, spring steel or plastics that will allow a certain amount of flexibility in the threading operation. When collar 13 is made out of a flexible material such as aluminum, spring steel or a plastic it will flex and follow the direction of thread 11 onto the grooved circular neck portion 8 during the threading operation. The ease with which the threading operation may be carried out will depend somewhat upon the flexibility of the collar material.

The collar 13 may be threaded onto neck portion 8 either by hand or by means of a suitable tool which will increase the leverage that can be exerted on the collar. The advantage of a tool or lever is unnecessary when the collar is made of rigid material that will flex.

I claim as my invention:

A non-losable assembly comprising a threaded fastener having a cylindrical head portion, a neck portion adjacent said head portion forming a groove, an angularly disposed slot formed in the outer periphery of said head portion, a collar having an uninterrupted circular inner periphery, a flexible anchoring means for said collar, the internal diameter of said collar being less than the diameter of said head portion, but greater than the diameter of the neck portion plus the depth of the groove, whereby the collar may be threaded through the slot in the head portion onto the neck portion and retained thereon against accidental removal.

ELDON E. SIMMS.